(12) United States Patent
Müller

(10) Patent No.: US 7,455,701 B2
(45) Date of Patent: Nov. 25, 2008

(54) COOLING PLATE MODULE WITH INTEGRAL SEALING ELEMENT FOR A FUEL CELL STACK

(75) Inventor: Alwin Müller, Würzburg (DE)

(73) Assignee: SGL Carbon AG, Wiesbaden (DE)

( * ) Notice: Subject to any disclaimer, the term of this patent is extended or adjusted under 35 U.S.C. 154(b) by 449 days.

(21) Appl. No.: 11/261,058

(22) Filed: Oct. 28, 2005

(65) Prior Publication Data
US 2006/0093882 A1 May 4, 2006

(30) Foreign Application Priority Data
Oct. 29, 2004 (EP) .................. 04025786

(51) Int. Cl.
H01M 4/82 (2006.01)
H01M 2/14 (2006.01)

(52) U.S. Cl. .................. 29/623.2; 429/38

(58) Field of Classification Search .......... 429/26, 429/38, 35; 29/623.2
See application file for complete search history.

(56) References Cited

U.S. PATENT DOCUMENTS

| 6,165,634 | A | 12/2000 | Krasij et al. |
| 6,596,427 | B1 | 7/2003 | Wozniczka et al. |
| 6,716,550 | B1 | 4/2004 | Kirby |
| 7,311,990 | B2 * | 12/2007 | Debe et al. ............ 429/35 |
| 2003/0031914 | A1 | 2/2003 | Frank et al. |
| 2003/0235744 | A1 | 12/2003 | Pflaesterer |
| 2004/0241524 | A1 | 12/2004 | Buechi et al. |

FOREIGN PATENT DOCUMENTS

| EP | 1 320 142 A2 | 6/2003 |
| JP | 2001/338673 | 12/2001 |
| WO | 03/063263 A2 | 7/2003 |

* cited by examiner

*Primary Examiner*—Patrick Ryan
*Assistant Examiner*—Thomas H. Parsons
(74) *Attorney, Agent, or Firm*—Laurence A. Greenberg; Werner H. Stemer; Ralph E. Locher

(57) ABSTRACT

A bipolar cooling plate module used in fuel cell stacks contains an anode-side terminal plate and a cathode-side terminal plate, in which at least one of the surfaces of the two terminal plates facing towards one another contains coolant channels. The two terminal plates are fixed to one another by an integral sealing element. The sealing element contains a sealing bead that surrounds the coolant distribution structure and seals the gap between the cooling surfaces of the two terminal plates. A compressible two-dimensional conducting element is inserted between the terminal plates, which extends only over the region of the cooling surfaces enclosed by the sealing groove, in which the coolant distribution structure is located. The element has a compression reserve that is sufficient to compensate for the shrinkage in thickness caused by cooling, of the sealing bead.

12 Claims, 5 Drawing Sheets

FIG. 4A
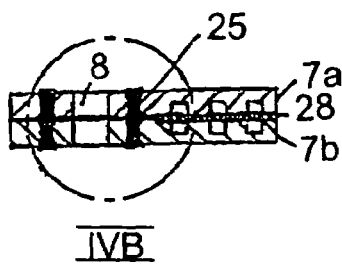
FIG. 4B
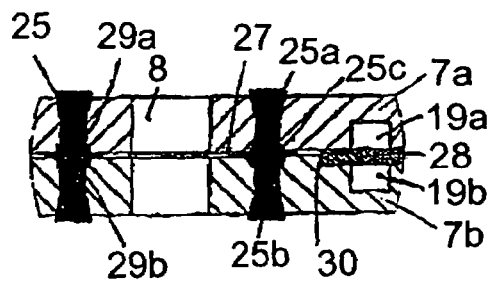
FIG. 4C
FIG. 4D
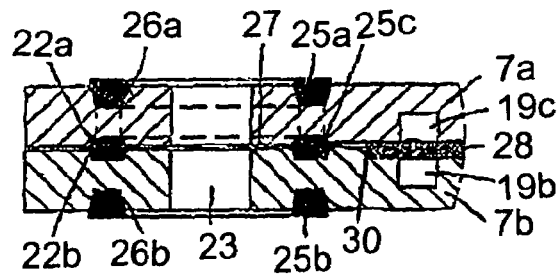
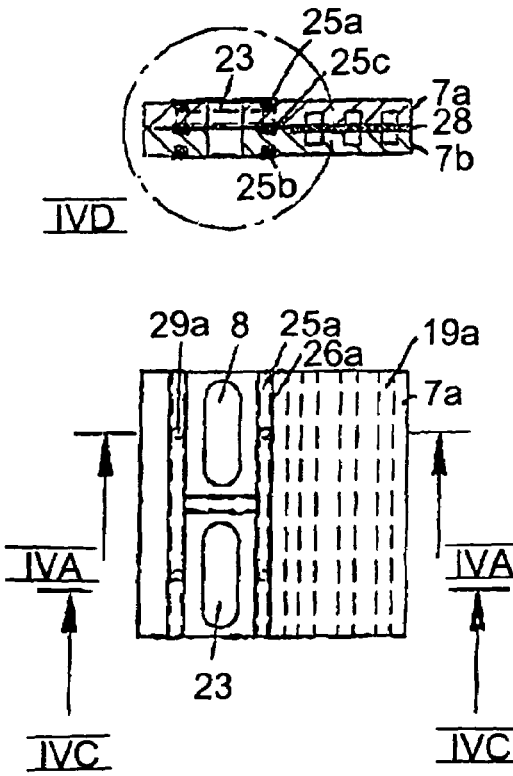
FIG. 4E
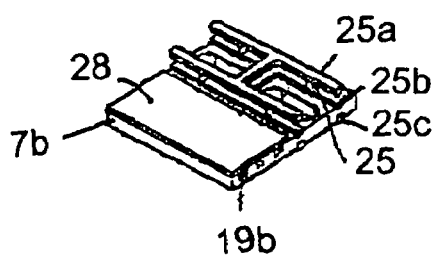
FIG. 4F FIG. 5A
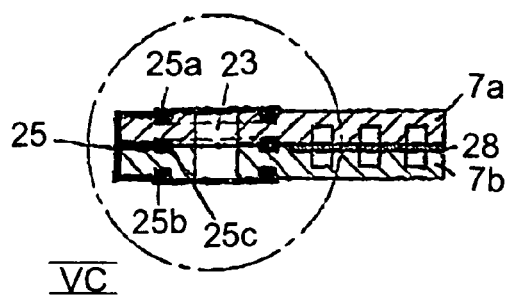
FIG. 5B
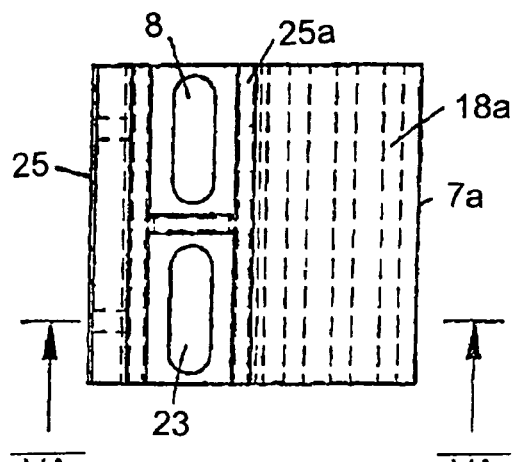
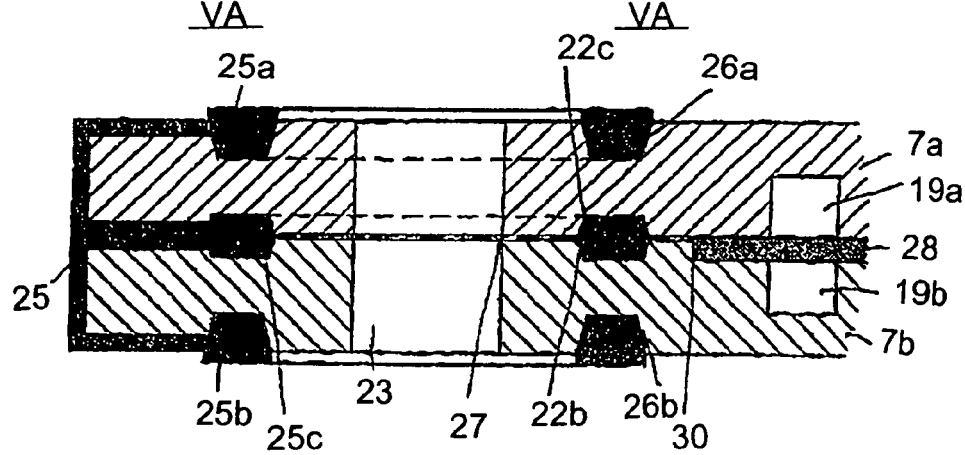
FIG. 5C

COOLING PLATE MODULE WITH INTEGRAL SEALING ELEMENT FOR A FUEL CELL STACK

BACKGROUND OF THE INVENTION

Field of the Invention

The present invention relates to a module containing two terminal plates for a fuel cell stack, in which an anode-side terminal plate and a cathode-side terminal plate, which tightly enclose a coolant distribution structure, are connected-to one another by an integral sealing element encompassing and/or penetrating both terminal plates.

Fuel cells are devices for the direct conversion of chemical energy into electrical energy. An individual fuel cell 1 (FIG. 1) contains two electrodes, namely an anode 2 and cathode 3, with an interposed electrolyte layer, e.g. a proton-conducting membrane 4. This composite structure is termed a membrane-electrode assembly (MEA) 5. An oxidation of a fuel, e.g. hydrogen or methanol, takes place at the anode 2 with the release of protons and electrons. The released electrons flow through an outer electrical circuit, in which they perform electrical work, to the cathode 3. The released protons are transported through the membrane 4 to the cathode 3. Here an oxidizing agent, for example oxygen, is reduced by the uptake of the electrons and protons. The interfaces between the anode 2 and cathode 3, respectively, and electrolyte 4 are coated with catalysts 6 that accelerate the respective electrode reaction.

For practical applications a plurality of fuel cells are generally combined in a stack bounded by end plates, in order to achieve the required output. Current collectors are provided before the first cell and after the last cell. The stacked cells are pressed against one another and clamped by longitudinal bolts, clamping devices or other suitable measures (not shown in FIG. 1). Normally the cells in the stack are connected electrically in series, but in parallel with respect to the media flow. Bipolar (twin terminal) plates (BPP) 7, 7' form the electrical contact between the adjacent cells. The successive BPP 7 and MEA 5 have aligned through-holes for a fuel supply 8 and fuel removal 9 as well as for an oxidizing agent supply 10 and oxidizing agent removal 11. These aligned through-holes form distribution and collection lines (manifolds), which pass through the stack in the stacking direction and supply the reaction media to and remove the reaction media from the individual cells.

The supply of the individual electrodes with the reaction media takes place via distribution structures incorporated into the surfaces of the BPP 7. The distribution structures contain suitably disposed flow paths, e.g. channels 17, for the uniform distribution of the reaction medium through the electrode surface. Projecting elements, e.g. webs 16 between the channels 17, form the electrical contact with the adjacent electrode 2 and 3. A distribution structure 12 on the anode side of the BPP 7 serves to distribute the fuel over the surface of the anode 2, while a distribution structure 13 on the cathode side serves to distribute the oxidizing agent over the surface of the cathode 3. The distribution structures 12, 13 are connected to the through-holes of the corresponding media supply lines 8, 10 and media removal lines 9, 11. These connections are identified as 14 and 15 in FIG. 1. The region of the surface of the bipolar plate that via the contact webs is in electrical contact, and via the media distribution structure is in mass exchange, with the adjoining electrode is termed hereinafter the active surface. The through-holes 8, 9, 10, 11 lie outside the active surface.

In addition to this type of construction with media supply and removal lines that are formed by aligned through-holes 8, 9, 10, 11 in the stack components (internal manifolding), stacks are also known with media supply and removal lines arranged outside the BPP and MEA surfaces (external manifolding). In this case the media supply and removal takes place via distribution and collection lines mounted laterally on the stack, which are connected to the respective media distribution structures on the plate surfaces.

Leakage and mixing of the various reaction media must be prevented. To this end, on the one hand the anode side of each BPP 7 is sealed against the through-holes 10, 11 for the oxidizing agent transport, and on the other hand the cathode side is sealed against the through-holes 8, 9 for the fuel transport. Also, the distribution structures 12, 13 incorporated into the plate surfaces are enclosed by seals 18a, 18b so that the outflow of the reaction media at the interfaces between the BPP and MEA is prevented.

Heat is released during the electrode reactions. The heat must be dissipated in order to prevent heating of the cells. For this purpose a coolant, e.g. deionized water or thermal oil, is passed through the stack. In a known implementation (FIG. 2) of a cooled stack, instead of a one-piece bipolar plate 7 a pair of two terminal plates 7a, 7b, which surround a coolant distribution structure, is disposed between two membrane-electrode assemblies 5, 5'. The surfaces of the terminal plates 7a, 7b that abut one another are hereinafter termed cooling surfaces. The coolant distribution structure is constructed similarly to the distribution structures 12, 13 for the reaction media and contains channels 19a, 19b incorporated in at least one of the cooling surfaces, through which the coolant flows, and webs 20 or similar projecting elements bounding the channels, that form the electrical contact between the adjacent cooling surfaces and thus permit the flow of current from the active surface of the terminal plate 7a to the active surface of the terminal plate 7b.

For the supply and removal of the coolant further transport paths passing through the stack have to be provided, and the transport paths of the coolant and of the reaction media must be sealed against one another. In addition seals 21 are necessary between the cooling surfaces of the terminal plates 7a, 7b, in order to prevent the leakage of the coolant from the coolant distribution structure. The seal 21 is accommodated by mutually co-operating sealing grooves 22a, 22b incorporated in the cooling surfaces of the terminal plates 7a, 7b.

As illustrated in FIGS. 1 and 2, the channel structure 12 for the two-dimensional distribution of the fuel is incorporated into the surface of the anode-side terminal plate 7b facing towards an anode 2' of a MEA 5'. A channel structure 13 for the two-dimensional distribution of the oxidizing agent is formed in the surface of the cathode-side terminal plate 7a facing towards the cathode 3 of the MEA 5. In an alternative variant the surfaces of the terminal plates facing towards the electrodes are flat, and the reaction media distribution structure is incorporated in the surface of the respective electrode facing towards the terminal plate.

Preferably the seals are produced in an injection-molding process from plastics materials having a sealing effect. Such a seal for fuel cell stacks with pairs of terminal plates formed in the manner described above is known from published, European patent application EP 1 320 142 A, corresponding to U.S. patent publication No. 2003/0235744 A1. The seal encloses at least one sandwich-like composite formed of two terminal plates with an interposed membrane-electrode assembly. The terminal plates project beyond the side edges of the MEA and thereby form a sealing gap. The seal according to the invention is formed of a surrounding elastic sealing tape that laterally encloses the composite, and includes a surrounding sealing strip that projects into the sealing gap and closes the sealing gap in a gas-tight manner when the terminal plates are pressed together. In an advantageous variant the seal is formed so that it projects beyond the front (end) faces of the outer terminal plates of the composite surrounded by the sealing tape and thus holds the composite together in a clamp-like manner. Modules are thereby formed, containing two terminal plates with an interposed MEA or two terminal plates with an interposed stack of a plurality of MEAs, which are separated from one another by one-piece bipolar plates. Defective modules can easily be replaced within a cell stack constructed in this way. However, the whole module has to be dismantled, even if only one component—for example a membrane or a catalyst layer—has failed.

The individual modules according to published, European patent application EP 1 320 142 A contain no coolant distribution structure, since only one-piece bipolar plates are provided within the module. A coolant distribution structure can only be realized between an outer terminal plate of a first module and an outer terminal plate of an adjoining second module. In this connection it is advantageous if the sealing element of the first module is formed with a surrounding sealing profile in the region of its clamping edge and the sealing element of the adjoining second module is formed as a flat surface in the region of its clamping edge. The coolant that circulates between the modules can easily be sealed by the co-operation of the thereby formed seals.

Another solution for the sealing of the coolant distribution structure is known from International patent disclosure WO 03/063263, corresponding to U.S. patent disclosure No. 2004/0241524 A1. An electrically conducting intermediate layer that can be deformed in the thickness direction is inserted between the cooling surfaces of the two terminal plates, one of which is provided with a coolant distribution structure in the form of an open labyrinth, so that the labyrinth is sealed by the intermediate layer and the cooling channels are closed. Advantageously the intermediate layer has a sealing capability with respect to the ambient atmosphere as well as with respect to the reaction media and the coolant that are used. The deformable intermediate layer adapts flexibly to the surfaces of the terminal plates facing it, so that higher manufacturing tolerances can be permitted for these. A suitable material for the production of the intermediate layer is graphite foil. The dimensions of the intermediate layer correspond to those of the adjoining terminal plates, i.e. the contour of the intermediate layer is identical to the contour of the terminal plates, so that the intermediate layer extends over the whole surface of the adjoining terminal plate. When assembling the stack the intermediate layers are pressed together between the adjoining terminal plates and thereby fill in a sealing manner the gaps between the cooling surfaces of the terminal plates. Although a reliable sealing of the coolant distribution structure between the terminal plates can indeed be achieved with this solution, such a cooling plate structure is formed, however, of three individual components, namely two terminal plates and the intermediate layer. More particularly, International patent disclosure No. WO 03/063263 also includes a variant in which at least two or all three components of this structure are joined together by bonding to form a module. However, it is conceded that the production of such bonded composites is very complicated. The requirements that the bonding agent have to satisfy are stringent, since it has to be not only electrically conducting but also chemically stable with respect to the reaction media and the coolant. In addition it must be able to withstand the operating temperatures and the cell voltage.

SUMMARY OF THE INVENTION

It is accordingly an object of the invention to provide a cooling plate module with an integral sealing element for a fuel cell stack which overcomes the above-mentioned disadvantages of the prior art devices of this general type, that can be combined-as complete structural groups with membrane-electrode assemblies to form a fuel-cell stack. In the cooling-plate module according to the invention a reliable sealing of the coolant distribution structure provided between the anode-side terminal plate and the cathode-side terminal plate is ensured. In addition, the necessary seals for the interfaces between the terminal plates and the electrodes are also provided by the module according to the invention.

With the foregoing and other objects in view there is provided, in accordance with the invention, a bipolar cooling plate module for a fuel cell stack. The bipolar cooling plate module contains terminal plates including a cathode-side terminal plate and an anode-side terminal plate. The terminal plates have first plate surfaces facing towards electrodes being either a cathode or an anode. The first plate surfaces have first sealing grooves formed therein for accommodating a sealing material for sealing interfaces with the electrodes. The cathode-side terminal plate and the anode-side terminal plate have mutually facing second plate surfaces acting as cooling surfaces with mutually complementary second sealing grooves formed therein for accommodating the sealing material for sealing a gap defined between the cooling surfaces. At least one of the cooling surfaces has a coolant distribution structure of open channels formed therein being enclosed by a respective one of the second sealing grooves. An integral sealing element formed of the sealing material being an injected-molded sealing material encompasses and/or penetrates both of the terminal plates, fixing the terminal plates in position and holding the terminal plates together as a composite. The integral sealing element fills the second sealing grooves on the cooling surfaces and seals the gap between the cooling surfaces, and further fills the first sealing grooves on the first plate surfaces facing towards the electrodes and seals the interfaces between the cathode-side terminal plate and the cathode and between the anode-side terminal plate and the anode. A compressible conducting two-dimensional element lies in the gap defined between the cooling surfaces of the terminal plates. The element has a compression reserve greater than a shrinkage in thickness, due to cooling, of the sealing material in the second sealing grooves. The element extends only over a region of the cooling surfaces of the terminal plates enclosed by the second sealing grooves filled with the sealing material, in which the coolant distribution structure is disposed.

The production of the cooling plate module according to the invention is carried out in an injection-molding process by applying the sealing element to the terminal plates between whose cooling surfaces the compressible element is inserted.

Other features which are considered as characteristic for the invention are set forth in the appended claims.

Although the invention is illustrated and described herein as embodied in a cooling plate module with an integral sealing element for a fuel cell stack, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 4A-4D are diagrammatic, sectional views of a first variant of the cooling plate module according to the invention with a sealing element passing through the terminal plates;

FIG. 4E is a diagrammatic, plan view of the first variant of the cooling plate module according to the invention with the sealing element passing through the terminal plates;

FIG. 4F is a diagrammatic, perspective view of the first variant of the cooling plate module according to the invention with the sealing element passing through the terminal plates;

FIG. 5A is a diagrammatic, sectional view of a second variant of the cooling plate module according to the invention with a sealing element encompassing the terminal plates;

FIG. 5B is a diagrammatic, plan view of the second variant of the cooling plate module according to the invention with the sealing element encompassing the terminal plates; and FIG. 5C is a diagrammatic, sectional view of the second variant of the cooling plate module according to the invention with the sealing element encompassing the terminal plates.

DESCRIPTION OF THE PREFERRED EMBODIMENTS

Figure 3:
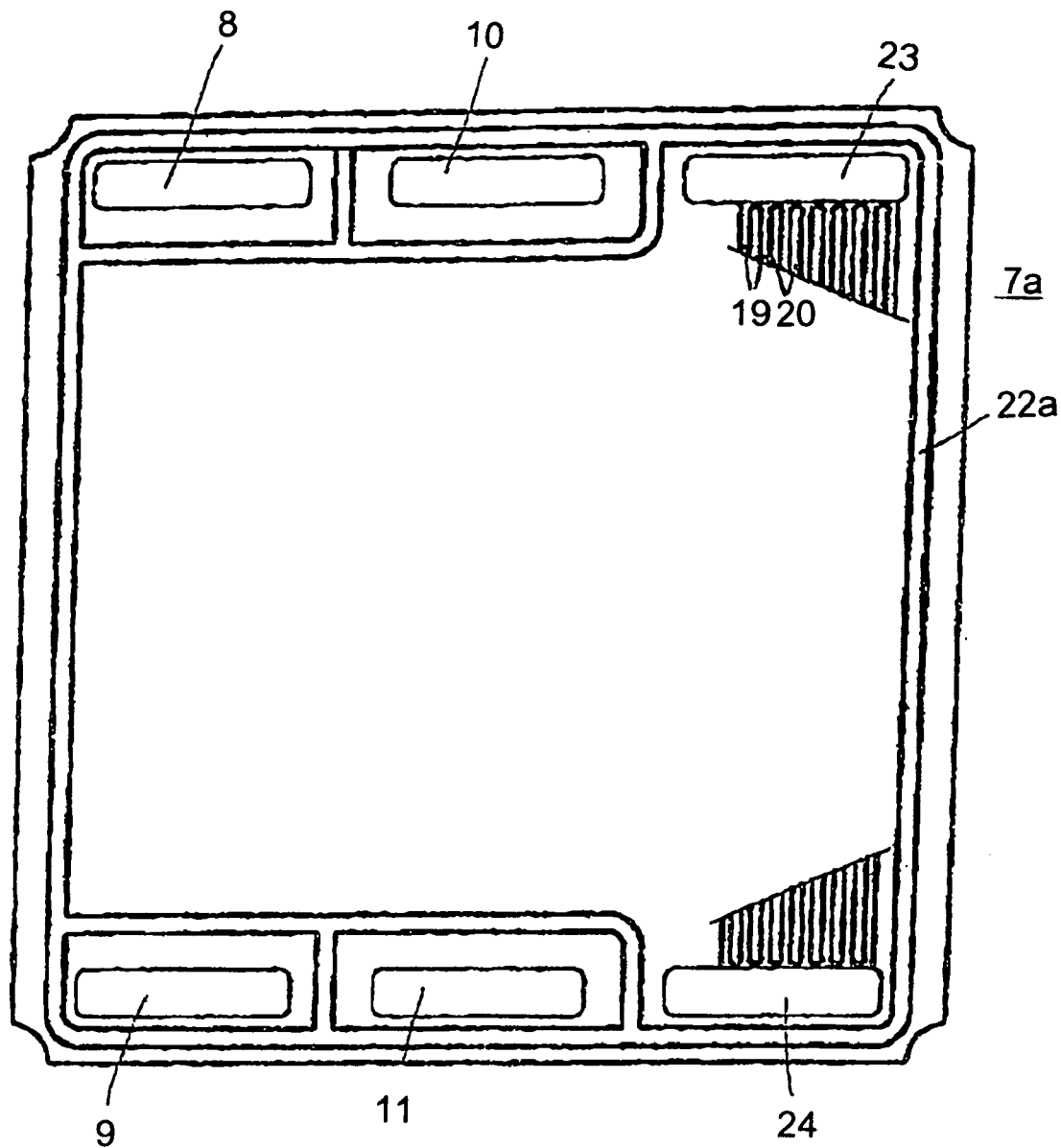
FIG. 3 is a diagrammatic, plan view of the cooling surface of a terminal plate with a coolant distribution structure and sealing grooves.

Referring now to the figures of the drawing in detail and first, particularly, to FIG. 3 thereof, there is shown a plan view of a cooling surface of a terminal plate 7a with an indicated coolant distribution structure and associated sealing grooves. In stacks with internal media supply and removal (internal manifolding) the supply of coolant takes place via a through-hole 23 and the removal of coolant takes place via a through-hole 24. All MEAs and terminal plates of a stack have such through-holes at the same position. When stacking the MEAs and terminal plates to form a stack the through-holes coincide, transport paths passing through the stack thereby being formed. The coolant flows from the supply line via the through-hole 23 into cooling channels 19 on the cooling surface, flows through the coolant channels 19, and flows from the cooling channels 19 via the through-hole 24 into the coolant removal line.

In FIG. 3 the exact course of the cooling channels was omitted for the sake of clarity, since it is not relevant to the present invention. A large number of suitable channel structures (flow fields) are known to the person skilled in the art, and the invention is not restricted to a specific channel structure. The channel structures for the distribution of the coolant is formed for example of a plurality of parallel channels that are fed by a common supply line and terminate in a common collection line, or formed of one or more meandering channels.

The coolant distribution structure containing the cooling channels 19a, 19b, including the through-holes for the coolant supply 23 and the coolant removal 24, is enclosed by a sealing groove 22a.

In the internal manifolding type of construction each terminal plate furthermore has through-holes for a fuel supply 8, fuel removal 9, oxidizing agent supply 10 and oxidizing agent removal 11 of the stack. These have no connection with the coolant distribution structure. The through-holes 8, 9, 10, 11 are, as illustrated in FIG. 3, surrounded by sealing grooves branching off from the sealing groove 22a.

The cooling surface of the second terminal plate 7b, which is combined with the terminal plate 7a illustrated in FIG. 3 to form the cooling plate module according to the invention, contains at the corresponding positions complementary sealing grooves 22b that co-operate with the sealing grooves 22a on the cooling surface of the first terminal plate 7a. In the cooling plate module according to the invention the grooves 22a and 22b enclose a sealing bead 25c, which forms one part of the sealing element 25 encompassing and/or passing through the two terminal plates and thereby holding them together. In the same way, on the outwardly aligned plate surfaces facing towards the electrodes 2', 3 in the fuel cell stack, the reaction media distribution structures 12' and 13, including the through-holes 8, 9 and 10, 11 for the supply and removal of the corresponding medium, as well as the through-holes for the other media, are in each case surrounded by grooves 26a, 26b for accommodating sealing beads 25a (cathode side) and 25b (anode side). The sealing beads 25a, 25b are likewise constituents of the integral sealing element 25 encompassing and/or passing through the two terminal plates 7a, 7b and thereby holding them together.

The reaction media distribution structures 12' and 13 may, instead of being incorporated in the surfaces of the terminal plates, also be incorporated in the surfaces of the adjoining electrodes 2', 3 facing the terminal plates. This, however, does not alter the position and function of the sealing grooves 26a, 26b and sealing beads 25a, 25b in the cooling plate module according to the invention.

The integral sealing element 25 according to the invention is configured so that it inseparably holds together the two terminal plates 7a, 7b, and seals a gap 27 between the cooling surfaces as well as the interfaces between the terminal plates and the electrodes. The sealing element 25 includes all seals required at the three interfaces terminal plate 7a/cathode 3, cooling surface of the terminal plate 7a/cooling surface of the terminal plate 7b, terminal plate 7b/anode 2', wherein these seals are connected to one another in a material-locking manner and thereby form an integral sealing element 25 holding the terminal plates together.

The sealing element 25 contains three sealing beads 25a, 25b, 25c: the sealing bead 25a at the terminal plate 7a/cathode 3 interface, the sealing bead 25c in the co-operating sealing grooves 22a, 22b on the cooling surfaces, and the sealing bead 25b at the terminal plate 7b/anode 2' interface. The sealing bead 25a surrounds the oxidizing agent distribution structure 13 including the through-holes 10, 11 for the supply and removal of the oxidizing agent, and separates these through-holes from the through-holes 23, 24, 8, 9 for the other media, namely coolant and fuel, which in each case are completely surrounded by strands of sealing material branching off from the sealing bead 25a. The sealing bead 25b surrounds the fuel distribution structure 12' including the through-holes 8, 9 for the supply and removal of the fuel, and separates these from the through-holes 23, 24, 10, 11 for the other media, namely coolant and oxidizing agent, which in each case are completely surrounded by strands of sealing material branching off from the sealing bead 25b. The sealing bead 25c surrounds the coolant distribution structure including the through-holes 23, 24 for the supply and removal of the coolant, and separates these from the through-holes 8, 9, 10, 11 for the other media, namely oxidizing agent and fuel, which in each case are completely surrounded by strands of sealing material branching off from the sealing bead 25c. The three sealing beads 25a, 25b, 25c are connected to one another in a material-locking manner via elements of the same material passing through the terminal plates and/or enclosing the edge surfaces thereof, and so inseparably hold the terminal plates together (see FIGS. 4A-5C).

Figure 1:
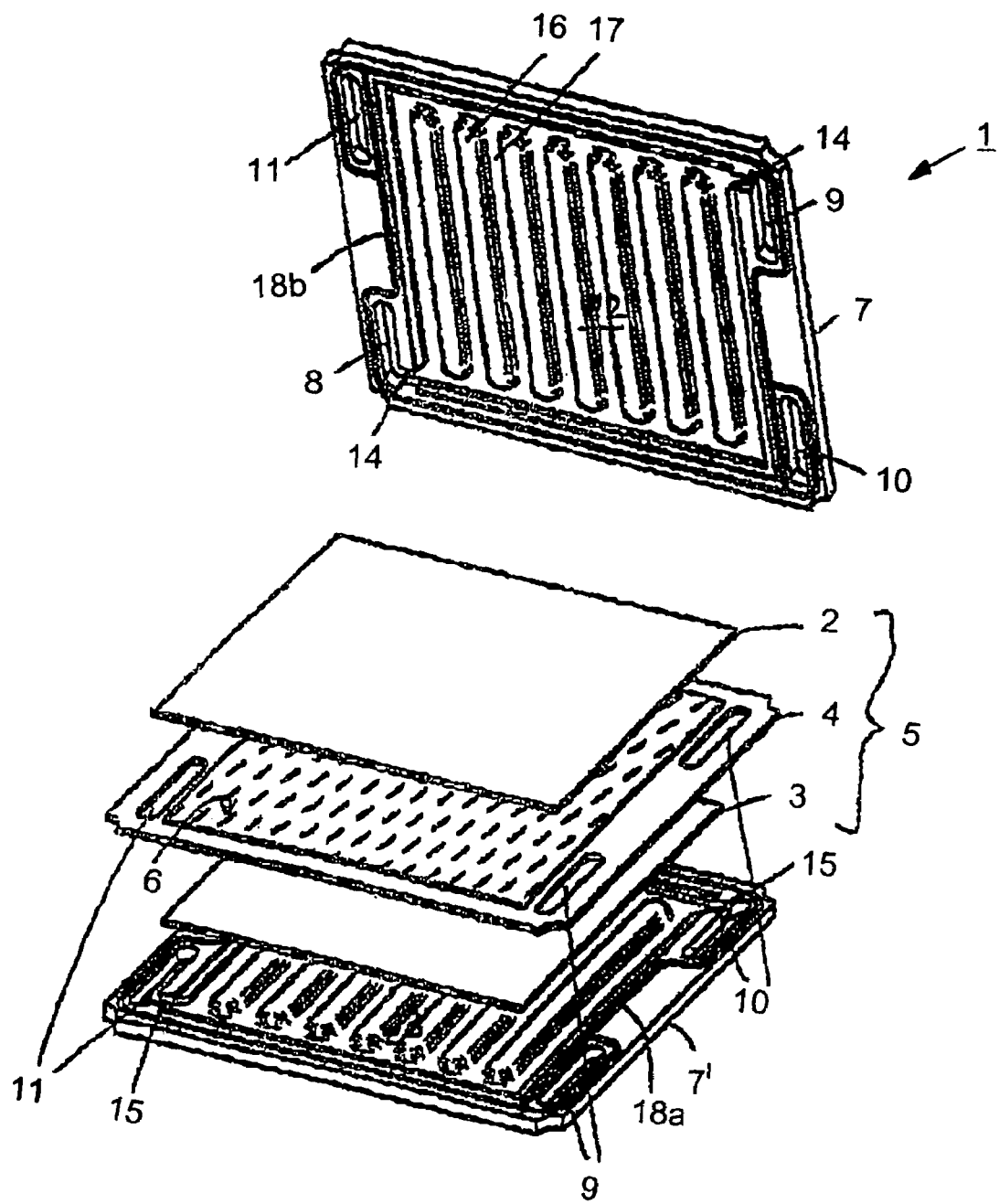
FIG. 1 is a diagrammatic, exploded, perspective view of a structure of a fuel cell stack according to the prior art.
Figure 2:
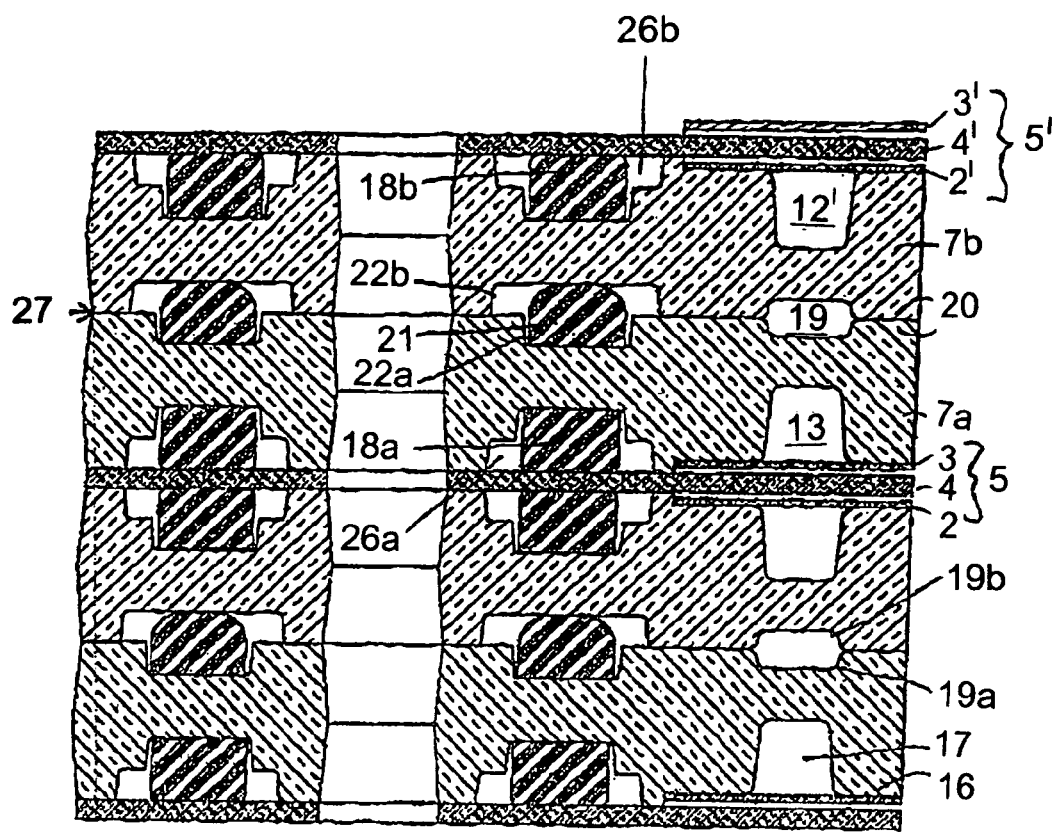
FIG. 2 is a diagrammatic, cross-sectional view of the structure of a cooling plate configuration for a fuel cell stack according to the prior art.

In contrast to this, according to the prior art the interfaces terminal plate 7a/cathode 3, terminal plate 7b/anode 2' and cooling surface of the terminal plate 7a/cooling surface of the terminal plate 7b are each sealed by separate seals 18a, 18b and 21 (see FIGS. 1 and 2).

A compressible, electrically conducting two-dimensional element 28, beyond whose side edges the terminal plates 7a, 7b project, is located in the gap 27 between the cooling surfaces of the terminal plates 7a, 7b of the cooling plate module according to the invention (see the cross-sectional drawings in FIGS. 4A-5C). The two-dimensional element 28 extends over the coolant distribution structure surrounded by a sealing groove 22a, 22b, without covering the sealing groove 22a, 22b and the outer edges of the cooling surfaces. The function of the two-dimensional element 28 is substantially to provide a compression reserve that compensates for the shrinkage in thickness, caused by cooling, of the sealing bead 25c between the cooling surfaces on installation in the stack. Preferably one of the cooling surfaces is provided with a depression 30 that accommodates the two-dimensional element 28. However, the depression 30 must not be so deep that it accommodates the whole thickness of the element 28, for then the compression reserve could no longer be exploited. The functions of the element 28 are explained in detail below.

For the function of the cooling plate module according to the invention it is sufficient if one of the cooling surfaces of the terminal plates 7a, 7b is provided with a coolant distribution structure 19a, 19b. This can be the cooling surface of the cathode-side terminal plate 7a or of the anode-side terminal plate 7b. The coolant distribution structure is formed of channels 19a, 19b open to the compressible two-dimensional element 28, which are covered by the two-dimensional element 28. In an alternative variant of the invention the cooling surfaces of both terminal plates 7a, 7b are provided with coolant distribution structures 19a, 19b. These two coolant structures 19a, 19b do not have to co-operate with one another since the coolant channels of both coolant distribution structures 19a, 19b are covered by the compressible two-dimensional element 28 lying between the terminal plates 7a, 7b. Accordingly, the two coolant distribution structures are independent of one another and may be configured differently. If, however, it is intended that the coolant distribution structures 19a, 19b co-operate with one another, then this can be achieved if perforations corresponding to the arrangement of the cooling channels 19a, 19b are provided in the compressible two-dimensional element 28 lying between the terminal plates 7a, 7b, so that the cooling channels are not covered. This variant is, however, not preferred on account of the greater manufacturing expenditure compared to the previous variants.

According to the invention there are various variants for the configuration of the integral sealing element 25.

A first variant, in which sealing beads 25a, 25b, 25c are connected to one another in a material-locking manner by connecting pieces passing through the terminal plates 7a, 7b, is illustrated in FIGS. 4A-4F.

In order to provide a better overview only sections of the terminal plates 7a, 7b are shown, and the electrodes 2', 3 have been omitted. The figures should be understood in such a way that the outwardly facing surface of the terminal plate 7a is adjacent to the cathode 3, and the outwardly facing surface of the terminal plate 7b is adjacent to the anode 2' (see in this connection also FIG. 2).

The sealing grooves 26a, 26b on the surfaces of the terminal plates 7a, 7b facing towards the electrodes 3, 2' are connected by bores 29a, 29b passing through the terminal plates 7a, 7b, to the sealing grooves 22a, 22b on the cooling surfaces. In this way a coherent sealing space passing through both terminal plates and containing the sealing groove 26a, the bores 29a in the terminal plate 7a, the sealing grooves 22a, 22b on the cooling surfaces of the terminal plates 7a, 7b, the bores 29b in the terminal plate 7b and the sealing groove 26b, is formed. If this space is completely filled with sealing material, the sealing beads 25a, 25b, 25c are connected in a material-locking manner to one another by the sealing material in the bores 29a, 29b. In this way the terminal plates 7a, 7b are held together and fixed in position by an integral sealing element 25 passing through both terminal plates (see the cross-sectional diagrams in FIGS. 4A and 4B, which show a cross-section through the cooling plate module along the bores 29a, 29b filled with sealing material). The spatial structure of the integral sealing element 25 is clear from FIG. 4F, in which the upper terminal plate 7a has been omitted here for the sake of clarity.

FIGS. 4C and 4D show a further cross-section through the cooling plate module according to the invention, but not along the bores 29a, 29b.

The part 25a of the sealing element 25 (shown in plan view in FIG. 4E) lying in the sealing groove 26a on the surface of the terminal plate 7a facing towards the cathode 3 seals the interface between the terminal plate 7a and the cathode 3 of the adjoining MEA 5. The part 25b of the sealing element 25 lying in the sealing groove 26b on the surface of the terminal plate 7b facing towards the anode 2' seals the interface between the terminal plate 7b and the anode 2' of the adjoining MEA 5'. The part 25c of the sealing element 25 embedded in the sealing grooves 22a, 22b on the cooling surfaces of the terminal plates 7a, 7b seals the gap 27 between the cooling surfaces.

Advantageously the sealing grooves 26a, 26b are disposed on the surfaces of the terminal plates 7a, 7b facing the electrodes 2', 3 in such a way that they lie exactly opposite the sealing grooves 22a, 22b on the cooling surfaces (see the cross-sectional drawings in FIGS. 4A and 4B). The sealing grooves 22a, 26a as well as 22b, 26b are connected by bores 29a and 29b, which pass through the material web remaining between the bottoms of the sealing grooves 22a, 26a and 22b, 26b.

In the injection-molding of this modification of the sealing element 25, the sealing material is for example injected into one of the grooves 26a, 26b or into both and/or into the gap 27, and passes through the bores 29a, 29b into the sealing grooves 22a, 22b lying on the cooling surfaces, and there forms the sealing bead 25c. Furthermore the material fills the bores 29a, 29b and finally forms the sealing beads 25a, 25b in the sealing grooves 26a, 26b.

From the sealing grooves 22a, 22b the sealing material flows, as illustrated in FIGS. 4B and 4D, also into the gap 27 between the cooling surfaces, the flow path being dependent on the viscosity of the sealing material. It cannot, however, penetrate so far into the gap 27 that it reaches and fills the cooling channels 19a, 19b, since these are covered by the two-dimensional element 28, which lies tightly against the cooling surfaces and thus forms a barrier against the inflowing sealing material.

The sealing material must also be prevented from flowing from the gap 27 into the throughholes 8, 9, 10, 11, 23, 24. In principle this can be achieved if devices are provided in the injection mold that block the through-holes. This variant is, however, not preferred on account of the more complicated construction of the mold and the difficulties encountered in demolding such a mold. However, the flow of the sealing material into the gap 27 can be restricted if this gap is maintained as narrow as possible. The width of the gap is determined by the thickness of the element 28. In order to minimize the gap width, a depression 30 for receiving the element 28 is provided on one of the two cooling surfaces, the depth of the depression being, however, less than the thickness of the element 28. The depression 30 must be configured so that the two-dimensional element 28 inserted therein rests in the injection mold tightly against the cooling surfaces, and when incorporated into a fuel cell stack still projects sufficiently far that the compression path is sufficient to compensate for the shrinkage, caused by cooling, of the injection-molded seal 25c.

In the second variant according to the invention (FIGS. 5A-C) the injection-molded sealing element 25 completely surrounds the edge surfaces of the terminal plates 7a, 7b, projects into the gap 27 between the cooling surfaces 7a, 7b, and extends up to the surrounding grooves 22a, 22b, in which a sealing bead 25c is formed. Also, the surrounding sealing element 25 extends onto the surface of the terminal plate 7b facing the anode 2' up to the sealing groove 26b, in which a sealing bead 25b is formed, and also onto the surface of the terminal plate 7a facing the cathode 3 up to the sealing groove 26a, in which a sealing bead 25a is formed (see the cross-sectional diagrams of the cooling plate module in FIGS. 5A and 5C according to the invention). For the sake of clarity, as in the case of FIGS. 4A-4F only sections of the terminal plates 7a, 7b are illustrated, and the electrodes 2', 3 have been omitted in FIGS. 5A and 5C. The figures should be understood in such a way that the outwardly facing surface of the terminal plate 7a adjoins the cathode 3, and the outwardly facing surface of the terminal plate 7b adjoins the anode 2' (see in this connection also FIG. 2).

Corresponding to FIGS. 5A-5C the coherent sealing element 25 is formed, which connects in a material-locking manner the sealing beads 25a, 25b in the grooves 26a, 26b on the surfaces of the terminal plates 7a, 7b facing towards the electrodes 2', 3, via the sealing material surrounding the edge surfaces of the terminal plates 7a, 7b, to the sealing bead 25c in the sealing grooves 22a, 22b between the cooling surfaces. This integral sealing element 25 encompassing both terminal plates 7a, 7b fixes the terminal plates 7a, 7b with the compressible element 28 placed therebetween and holds them together.

The part 25a of the sealing element 25 (shown in plan view in FIG. 5C) lying in the sealing groove 26a on the surface of the terminal plate 7a facing the cathode 3 seals the interface between the terminal plate 7a and the cathode 3 of the adjoining MEA 5. The part 25b of the sealing element 25 lying in the sealing groove 26b on the surface of the terminal plate 7b facing towards the anode 2' seals the interface between the terminal plate 7b and the anode 2' of the adjoining MEA 5'. The part 25c of the sealing element 25 embedded in the sealing grooves 22a, 22b on the cooling surfaces of the terminal plates 7a, 7b seals the gap 27 between the cooling surfaces.

In the injection-molding of this variant of the sealing element 25 according to the invention the sealing material is preferably injected onto the edge surfaces of the terminal plates 7a, 7b. From here the sealing material enters the gap 27 and fills the co-operating sealing grooves 22a, 22b on the cooling surfaces and forms the sealing bead 25c. The material cannot, however, penetrate so far into the gap 27 that it reaches and fills the cooling channels, since these are covered by the two-dimensional element 28, which rests tightly against the cooling surfaces and thus forms a barrier against the inflowing sealing material. At the same time the sealing material flows onto the outwardly facing surfaces of the plates 7a, 7b and there fills the sealing grooves 26a, 26b, with the formation of the sealing beads 25a, 25b.

Exactly as in the variant according to FIGS. 4A-4F described previously, in this case too the gap 27 is maintained as tight as possible by embedding the element 28 in the depression 30 in order to prevent the penetration of the injected sealing material into the through-holes 8, 9, 10, 11, 23, 24. Furthermore, there is also the possibility in this case of blocking the through-holes on the mold side during the injection-molding process, though this variant is not preferred on account of the complicated mold configuration.

Finally, the variants from FIGS. 4A-4F and FIGS. 5A-5C may also be combined with one another so that the locking-type connection between the sealing beads 25a, 25b on the plate surfaces facing the electrodes 3, 2' and the sealing bead 25c between the cooling surfaces is effected via bores 29a, 29b filled with the sealing material and passing through the terminal plates 7a, 7b and joining the sealing grooves on the opposite facing plate surfaces, as well as via sealing material flowing out of the sealing gaps and encompassing the edge surfaces of the terminal plates.

The sealing element 25 is produced by injection-molding in a suitably configured mold, in which the pre-formed terminal plates 7a, 7b together with the compressible element 28 positioned therebetween have previously been placed. After the injection-molding process the sealing material cools, whereby it inevitably shrinks. The mold is then demolded, i.e. the composite is removed.

The two-dimensional compressible element 28 lying between the cooling surfaces and extending over the coolant distribution structure 19 surrounded by the sealing bead 25c does not itself have a sealing function, but has supporting functions that will be explained hereinafter.

The sealing element 25 is formed of a plastics material, for example a thermoplastic elastomer (e.g. ethylene/propylene/diene elastomer), thermoplastic urethane or liquid silicone rubber, which is applied in an injection-molding process so that the sealing grooves 22a, 22b are completely filled with the sealing bead 25c. In the subsequent cooling the sealing material inevitably shrinks. It is known that such materials shrink by one to two-hundredths per millimeter dimension. The result is that the sealing grooves 22a, 22b and the gap 27 are not completely filled with the sealing material and the sealing function cannot be reliably guaranteed.

This disadvantage is overcome in the following way by the structure of the cooling plate module according to the invention. To produce the sealing element 25 the terminal plates 7a, 7b together with the compressible element 28 lying therebetween are placed in the injection mold. The injection mold is configured so that the compressible element 28 rests tightly against the cooling surfaces of the terminal plates 7a, 7b. However, the compressibility reserve of the compressible element 28 in the mold must still not be completely exhausted, i.e. its thickness must not be reduced by the maximum possible compression path. Instead, the mold should be dimensioned so that the compressible element still retains a compressibility reserve whose compression path is at least as large as the expected shrinkage, due to cooling, of the sealing material in the sealing bead 25c. Normally the sealing bead 25c is approximately 0.5 to 2 mm thick, and with a shrinkage due to cooling of at most 2% (see above) a compressibility reserve of at most 0.04 mm should therefore be maintained.

The depression 30 for accommodating the two-dimensional element 28 is optionally provided on one of the cooling surfaces. The depression 30 must, however, not accommodate the whole thickness of the element 28, and the element must still project sufficiently far so that its compression reserve can still compensate for the thermal shrinkage of the seal. The advantage of embedding the two-dimensional element 28 in the depression 30 is that the gap 27 between the cooling surfaces becomes narrower, and that in principle thicker layers 28 can be used than if the element were not embedded in the depression. A thicker layer would in turn provide a larger compression reserve for the same material.

On injection the sealing material passes through the gap 27 between the cooling surfaces and/or from the sealing grooves 26a, 26b on the outwardly facing surfaces of the terminal plates 7a, 7b via the bores 29a, 29b into the sealing grooves 22a, 22b. In this connection the sealing material must be prevented from penetrating so far into the gap 27 between the cooling surfaces that it reaches the cooling channels 19 and blocks them. This is prevented by the compressible two-dimensional element 28 provided between the cooling surfaces and extending over the coolant distribution structure, since the element 28 lies tightly against the cooling surfaces and blocks further entry of the flowing sealing material into the gap 27, so that it cannot penetrate into the region of the coolant distribution structure 19.

In order also to avoid penetration of the injected sealing material into the through-holes 8, 9, 10, 11, 23, 24, the gap 27 must be as narrow as possible. Its width is determined by the thickness of the element 28; if part of the thickness of the element 28 is, however, accommodated by the depression 30, the gap 27 can be maintained correspondingly narrow.

To summarize, the functions of the compressible element 28 can be itemized as now described.

A barrier is formed that during the injection-molding of the sealing element 25 prevents the flowing sealing material from penetrating the gap 27 between the cooling surfaces and entering the cooling channels 19a, 19b.

A compressibility reserve is provided that during compression in the fuel cell stack compensates for the shrinkage, caused by cooling, of the sealing bead 25c that is intended to seal the gap between the cooling surfaces of the terminal plates 7a, 7b.

The two terminal plates 7a, 7b together with the compressible element 28 lying therebetween are fixed in situ to one another by the sealing element 25 and are held together as a composite. The bipolar cooling plate modules according to the invention that are thereby obtained are ready for installation. A fuel-cell stack is obtained by alternately stacking on top of one another cooling plate modules according to the invention and membrane-electrode assemblies, in which in each case the anode plate of a cooling plate module is followed by the anode of a membrane-electrode assembly, and the cathode plate of a cooling plate module is followed by the cathode of a membrane-electrode assembly, attachment of current collectors before the first and after the last terminal plate, if necessary application of external manifolds and other additional components, and clamping of the stack between end plates.

In the finished assembled stack a pressure of approximately 0.5 to 3 MPa acts on the components. In this way the compression reserve (spring path) of the compressible element 28 is exhausted to such an extent that the thickness of the compressible element is reduced at least by the shrinkage, caused by cooling, of the sealing bead 25c. If necessary the compressibility reserve of the sealing material is also completely or partly exhausted, in other words the compression path of the compressible element then includes the shrinkage, caused by cooling, of the sealing material and, depending on the compression force, the whole compression path of the sealing material or a part of the compression path of the sealing material. In this way it is ensured that the sealing material completely fills the sealing groove 22a, 22b and reliably seals the gap between the cooling surfaces.

Since the sealing groove in the cooling plate module according to the invention is in any case completely filled by the sealing material of the sealing bead 25c, no strict tolerances have to be maintained for the fabrication of the sealing grooves 22a, 22b. The compressed sealing material adapts to the wall of the groove and compensates for possible existing unevennesses in the groove surfaces.

The absolutely necessary electronic conductivity results from the position of the compressible element 28 between the cooling surfaces of the terminal plates 7a, 7b, since otherwise the electrical contact between the terminal plates would not be possible. A suitable material that satisfies all requirements on the element 28 as regards electrical conductivity and compressibility is flexible graphite foil. A further advantage of this material is its ability to adapt flexibly to the adjacent surfaces and thus compensate for possible deviations from plane parallelism of the surfaces. For example, a graphite foil with an initial thickness of 500 μm obtainable as a commercial product can be compressed by 10%, i.e. by 50 μm, under an area compression of approximately 3 MPa (i.e. an area compression of comparable magnitude to that in the fuel cell stack). This compression reserve is sufficient to compensate for the expected shrinkage in thickness of the sealing bead.

On the basis of this favorable property profile flexible graphite foils have already been used for a long time as sealing materials. The production of flexible graphite foils is known in the art. Suitable alternatives are nonwovens, felts, papers or woven fabrics of carbon or graphite fiber, as long as they have a sufficient compressibility in order to be able to compensate for the shrinkage of the sealing material by exhausting the compression path.

The invention is not restricted to a specific material for the terminal plates 7a, 7b, but is suitable for all materials according to the prior art that can be used for producing bipolar plates, for example graphite, metal or composite materials of plastics and conducting particles. The decisive factor is that the material should be electrically conducting, corrosion-resistant and impermeable, and should also be able to be fashioned into the required shape with acceptable effort and expenditure.

Metals that are not sufficiently corrosion-resistant must be alloyed and/or provided with a corrosion-resistant, electrically conducting coating, for example of a noble metal, in order to reduce corrosion. Graphite in its various forms may be used. Terminal plates can be fabricated from monolithic blocks of synthetic graphite by cutting and machining. Alternatively, suitably structured sheets of flexible graphite can be used as terminal plates.

The production of terminal plates from composite materials of plastics and conducting particles is particularly advantageous, since forming processes known from plastics technology, such as injection-molding—possibly with some modifications—can be used in this case. In conventional insulating plastics such as polypropylene, polyvinylidene fluoride., vinyl esters or phenol resins or epoxy resins, electrical conductivity can be achieved by adding electrically conducting particles, for example particles of synthetic or natural graphite, graphite expandate, carbon black, carbon fibers, metal chips, metal fibers of combinations of several of these types of conducting particles. The concentration of the conducting particles must be sufficiently high in order to exceed the percolation threshold, so that a continuous network of electrical conducting pathways is formed in the plastics matrix. The high mass fraction of the conducting particles (more than 60%) required for this purpose reduces the flowability of the plastics, however, so that appropriate measures must be adopted in its processing by known plastics processing methods. These measures are, however, known to the person skilled in the art. Alternatively terminal plates may be formed from a composite material of plastics and conducting particles in a suitably structured compression mold.

It is particularly preferred to produce the terminal plates from an injection-moldable conducting plastics material or from an injection-moldable plastics material containing conducting particles.

It is also known to restrict the use of the conducting material, which is difficult to process and is also comparatively expensive, to the region of the terminal plates that has to be functionally conducting, in order to form the electrical contact with the adjacent electrodes. The edge region of the terminal plate projecting beyond the electrode surface, in which preferably are also located the through-holes for the transport pathways passing through the stack for reaction media and cooling water, is produced from an inexpensive plastics material without conducting additives that can also easily be processed in complicated shapes. Preferably this is the same plastics material as used in the conducting region or is a plastics material compatible therewith, so that a material-locking-type composite is formed between the two regions. Further details of such terminal plates and bipolar plates consisting of conducting and non-conducting regions are known from published, European patent application EP 1 367 664, corresponding to U.S. patent publication No. 2003/413038. In connection with the present invention it is advantageous to provide the sealing grooves 22a, 22b, 26a, 26b and if necessary the groove-connecting bores 29a, 29b in the non-conducting edge region of the terminal plates, since these can be produced from a readily-formable material.

The invention has been described here specifically by way of example for stacks with internal media supply and removal manifolds. It is, however, not restricted to this type of construction, but can be used, by adapting the contour of the sealing beads to the position of the media supply and removal outside the plate surfaces, also for stacks with external media supply and removal manifolds.

The cooling plate modules according to the invention have several advantages.

First of all, the complete filling of the sealing grooves with a sealing material introduced in the injection-molding process is ensured despite the shrinkage caused by cooling. At the same time, due to the fact that the compressible element 28 acts as a barrier the sealing material is prevented from penetrating into the region of the coolant distribution structure and blocking the cooling channels 19a, 19b.

A further advantage is that all sealing functions for all interfaces are fulfilled by a single integral sealing element 25. The stack structure is thus simplified, and instead of a plurality of separate process steps for sealing the individual interfaces with seals 18a, 18b and 21 (FIGS. 1 and 2), now only one process step is necessary.

Furthermore the concept according to the invention enables assemblies containing an anode-side terminal plate and cathode-side terminal plate with coolant distribution structure and all seals necessary for the mutual sealing of the flow paths of the various media to be produced as a complete structural group. These structural groups according to the invention can be mounted directly with membrane-electrode assemblies (MEAs) to form a cell stack and can be clamped without having to add further seals during the installation process.

This stack is formed of two types of structural groups, between which the different functions are shared: the membrane-electrode assemblies take over the electrochemical function, and the cooling plate modules take over the functions of series electrical circuitry, media distribution and sealing. In such a stack defective cooling plate modules or defective membrane-electrode assemblies can be replaced independently of one another. This is an advantage compared to the concept known from the prior art according to published, European patent EP 1 320 142, in which the fuel cell stack formed of individual modules that contain terminal plates and membrane-electrode assemblies, so that each individual module has to fulfill electrochemical functions as well as the functions of series electrical contact, media distribution and sealing. Although the stack in EP 1 320 192 basically contains only one type of structural group, these are, however, substantially more complex in structure and have to fulfill several functions.

It is, however, less likely that such a module will fail as regards all its functions, i.e. simultaneously a MEA and the adjoining terminal plates fail and have to be replaced. More often it is the case that either a membrane-electrode assembly has to be replaced, for example on account of irreversible drying out of the proton-conducting membrane, irreversible deactivation of catalysts or puncture of the membrane, or a terminal plate has to be replaced on account of leakage or material fatigue. This is possible with the concept according to the invention, whereas with the concept according to the prior art in such a case components that are not themselves defective are also dismantled and discarded when dismantling defective modules.

This application also claims the priority, under 35 U.S.C. §119, of European patent application No. 04 025 786.7, filed Oct. 29, 2004; the entire disclosure of the prior application is herewith incorporated by reference.

I claim:

1. A bipolar cooling plate module for a fuel cell stack, the bipolar cooling plate module comprising:

terminal plates including a cathode-side terminal plate and an anode-side terminal plate, said terminal plates having first plate surfaces facing towards electrodes selected from the group consisting of a cathode and an anode, said first plate surfaces having first sealing grooves formed therein for accommodating a sealing material for sealing interfaces with said electrodes, said cathode-side terminal plate and said anode-side terminal plate having mutually facing second plate surfaces acting as cooling surfaces with mutually complementary second sealing grooves formed therein for accommodating said sealing material for sealing a gap defined between said cooling surfaces, at least one of said cooling surfaces having a coolant distribution structure of open channels formed therein being enclosed by a respective one of said second sealing grooves;

an integral sealing element formed of said sealing material being an injected-molded sealing material encompassing and/or penetrating both off said terminal plates, fixing said terminal plates in position and holding said terminal plates together as a composite, said integral sealing element filling said second sealing grooves on said cooling surfaces and sealing said gap between said cooling surfaces, and further filling said first sealing grooves on said first plate surfaces facing towards the electrodes and sealing said interfaces between said cathode-side terminal plate and the cathode and between said anode-side terminal plate and the anode; and a compressible conducting two-dimensional element lying in said gap defined between said cooling surfaces of said terminal plates, said element having a compression reserve greater than a shrinkage in thickness, due to cooling, of said sealing material in said second sealing grooves, said element extending only over a region of said cooling surfaces of said terminal plates enclosed by said second sealing grooves filled with said sealing material, in which said coolant distribution structure is disposed.

2. The cooling plate module according to claim 1, wherein said integral sealing element encompasses and/or passes through both of said terminal plates and is formed of first, second and third sealing beads connected to one another in a material-locking manner, said first sealing bead filling said first sealing grooves on a surface of said cathode-side terminal plate facing towards the cathode and seals said interface between said cathode-side terminal plate and the cathode, said second sealing bead filling said first sealing groove on a surface of said anode-side terminal plate facing towards the anode and seals said interface between said anode-side terminal plate and the anode, said third sealing bead filling said second sealing grooves on said cooling surfaces and encloses said gap between said cooling surfaces.

3. The cooling plate module according to claim 2, wherein:
said cathode-side terminal plate has first bores formed therein passing through said cathode-side terminal plate, said first bores connecting said first sealing groove on said surface facing towards the cathode to said second sealing groove on said cooling surface;
said anode-side terminal plate having second bores formed therein passing through said anode-side terminal plate, said second bores connecting said first sealing groove on said surface facing towards the anode to said second sealing groove on said cooling surface; and
said first and second bores are filled with said sealing material that connects said third sealing bead to said first and second sealing beads in said material-locking manner and thereby forms said integral sealing element passing through both of said terminal plates.

4. The cooling plate module according to claim 2, wherein said injection-molded integral sealing element encloses edge surfaces of said terminal plates and thereby connects said third sealing bead to said first and second sealing beads in said material-locking manner.

5. The cooling plate module according to claim 2, wherein:
said terminal plates have bores formed therein; and
said third sealing bead is connected in said material-locking manner to said first and second sealing beads by said bores filled with said sealing material, and by said sealing material enclosing edge surfaces of said terminal plates.

6. The cooling plate module according to claim 2, wherein said first plate surfaces of said terminal plates facing towards the electrodes have reaction media distribution structures that are surrounded by said first and second sealing beads.

7. The cooling plate module according to claim 1, wherein said integral sealing element is formed of a material selected from the group consisting of a thermoplastic elastomer, a thermoplastic urethane and a liquid silicone rubber.

8. The cooling plate module according to claim 1, wherein said electrically conducting compressible two-dimensional element is formed of a material selected from the group consisting of a flexible graphite foil, a nonwoven fabric of carbon, a nonwoven fabric containing graphite fibers, a felt containing carbon, a felt containing graphite fibers, carbon paper, graphite fiber paper, a woven fabric of carbon and a woven fabric containing graphite fibers.

9. The cooling plate module according to claim 1, wherein said cooling surfaces of both of said terminal plates have said open channels formed therein for distributing a coolant.

10. The cooling plate module according to claim 1, wherein said first plate surfaces of said terminal plates facing towards the electrodes contain no reactant distribution structures and are combined with the electrodes that are provided on their surfaces facing towards said terminal plates with reactant distribution structures.

11. The cooling plate module according to claim 1, wherein one of said cooling surfaces of said terminal plates has a depression formed therein for accommodating said element, said depression having a depth configured so that said element still projects out from said depression to such an extent that its compression path is sufficient to compensate for the shrinkage, caused by cooling, of said sealing material in said second sealing grooves between said cooling surfaces.

12. A process for producing a bipolar cooling plate module, which comprising the steps of:
preforming terminal plates resulting in preformed terminal plates having cooling surfaces and sealing grooves;
inserting the preformed terminal plates together with a two-dimensional compressible element resting tightly against and between the cooling surfaces and extending only over a region enclosed by the sealing grooves;
injecting a sealing material, filling the sealing grooves, and forming a sealing element;
cooling the sealing material, the two-dimensional compressible element having a compression reserve that is at least as large as a shrinkage in thickness, caused by cooling, of the sealing material in the sealing grooves and on incorporation into a fuel cell stack is exhausted by area compression acting there; and
demolding the bipolar cooling plate module.

* * * * *